(12) United States Patent
Panikkar et al.

(10) Patent No.: US 11,960,559 B2
(45) Date of Patent: Apr. 16, 2024

(54) SECURE ONLINE CONFERENCING

(71) Applicant: Dell Products L.P., Round Rock, TX (US)

(72) Inventors: Shibi Panikkar, Bangalore (IN); Rohit Gosain, Bangalore (IN); Rangan Basu, Gurugram (IN)

(73) Assignee: Dell Products L.P., Round Rock, TX (US)

( * ) Notice: Subject to any disclaimer, the term of this patent is extended or adjusted under 35 U.S.C. 154(b) by 270 days.

(21) Appl. No.: 17/536,593

(22) Filed: Nov. 29, 2021

(65) Prior Publication Data
US 2023/0169135 A1 Jun. 1, 2023

(51) Int. Cl.
*G06F 16/955* (2019.01)
*H04L 9/40* (2022.01)
*H04L 12/18* (2006.01)
*H04L 29/06* (2006.01)

(52) U.S. Cl.
CPC ...... *G06F 16/9566* (2019.01); *H04L 12/1818* (2013.01); *H04L 63/0428* (2013.01); *H04L 63/168* (2013.01)

(58) Field of Classification Search
CPC .......................... G06F 16/9566; H04L 12/1818
See application file for complete search history.

(56) References Cited

U.S. PATENT DOCUMENTS

| | | | | |
|---|---|---|---|---|
| 11,374,911 B1 * | 6/2022 | Krohn | ................... | H04L 63/065 |
| 11,575,506 B2 * | 2/2023 | Kilburn | ................ | H04L 9/3073 |
| 2022/0247797 A1 * | 8/2022 | Leduc | ................. | H04L 12/1822 |

* cited by examiner

Primary Examiner — Nazia Naoreen
(74) Attorney, Agent, or Firm — DALY, CROWLEY, MOFFORD & DURKEE, LLP

(57) ABSTRACT

An example methodology implementing the disclosed techniques includes receiving an online meeting Uniform Resource Locator (URL) for an online meeting that is being scheduled. The method also includes determining whether the online meeting is a secure online meeting. The method also includes, responsive to a determination that the online meeting is a secure online meeting, generating a personalized online meeting URL for each meeting participant that is invited to the secure online meeting, the personalized online meeting URL being based on the online meeting URL. The method further includes encrypting the generated personalized online meeting URLs and sending to each meeting participant that is invited an invitation to the secure online meeting. The invitation sent to each invited meeting participant includes an encrypted personalized online meeting URL that is generated for that invited meeting participant.

20 Claims, 6 Drawing Sheets https://Acme.zoom.us/j/95198759699?pwd=amFzKzBxMk4rTG5QRVhTdDhPZThhZz09

FIG. 1 https://Acme.zoom.us/j/95198759699?pwd=amFzKzBxMk4rTG5QRVhTdDhPZThhZz09 https://Acme.zoom.us/j/95198759699?pwd=amFzKzBxMk4rTG5QRVhTdDhPZThhZz09 & receiver = Adam_Jones@acme.com https://Acme.zoom.us/j/95198759699?pwd=amFzKzBxMk4rTG5QRVhTdDhPZThhZz09 & receiver = Jane_Smith@acme.com https://Acme.zoom.us/<Encrypted_Text1> https://Acme.zoom.us/<Encrypted_Text1>

Acme Zoom Meeting Link

SECURE ONLINE CONFERENCING

BACKGROUND

Due at least in part to the growth of high-speed networks such as the Internet, organizations, such as companies, enterprises, governments, and agencies, are increasingly relying on online conferencing (also known as web conferencing or online meetings) to conduct its activities. Online conferencing allows people in geographically dispersed locations to attend or participate in an online meeting, conferences, presentations, trainings, and the like, without having to travel to a remote location. For example, a meeting organizer can use an online meeting client application to schedule an online meeting and invite one or more meeting participants. When the online meeting scheduled, an online meeting server application can generate a meeting link, such as a Hypertext Transport Protocol (HTTP) link (e.g., a Uniform Resource Locator (URL)), and include the meeting link with the invitations sent to the invited meeting participants. At the scheduled time, the invited meeting participants can use the meeting link provided with the meeting invitation to join and attend the online meeting.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a computer implemented method includes receiving an online meeting Uniform Resource Locator (URL) for an online meeting that is being scheduled and determining whether the online meeting is a secure online meeting. The method also includes, responsive to a determination that the online meeting is a secure online meeting, generating a personalized online meeting URL for each meeting participant that is invited to the secure online meeting, the personalized online meeting URL being based on the online meeting URL. The method further includes encrypting the generated personalized online meeting URLs and sending to each meeting participant that is invited an invitation to the secure online meeting. The invitation sent to each invited meeting participant includes an encrypted personalized online meeting URL that is generated for that invited meeting participant.

In some embodiments, generating a personalized online meeting URL for each meeting participant that is invited comprises appending a query string to the online meeting URL, the query string being specific to each meeting participant.

In one aspect, the query string is used to validate a meeting participant requesting to join the secure online meeting.

In one aspect, the query string specific to the invited meeting participant is an email address associated with the invited meeting participant.

In one aspect, the query string specific to the invited meeting participant is a user identifier associated with the invited meeting participant.

In some embodiments, the encrypted personalized online meeting URL is included in the invitation as a descriptive link.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to receive an online meeting Uniform Resource Locator (URL) for an online meeting that is being scheduled and determine whether the online meeting is a secure online meeting. Execution of the instructions also causes the one or more processors to, responsive to a determination that the online meeting is a secure online meeting, generate a personalized online meeting URL for each meeting participant that is invited to the secure online meeting, the personalized online meeting URL being based on the online meeting URL. Execution of the instructions further causes the one or more processors to encrypt the generated personalized online meeting URLs and send to each meeting participant that is invited an invitation to the secure online meeting. The invitation sent to each invited meeting participant includes an encrypted personalized online meeting URL that is generated for that invited meeting participant.

In some embodiments, to generate a personalized online meeting URL for each meeting participant that is invited comprises to append a query string to the online meeting URL, the query string being specific to each meeting participant.

In one aspect, the query string is used to validate a meeting participant requesting to join the secure online meeting.

In one aspect, the query string specific to the invited meeting participant is an email address associated with the invited meeting participant.

In one aspect, the query string specific to the invited meeting participant is a user identifier associated with the invited meeting participant.

In some embodiments, the encrypted personalized online meeting URL is included in the invitation as a descriptive link.

According to another illustrative embodiment provided to illustrate the broader concepts described herein, a computer implemented method includes, responsive to an activation of a meeting link by a user, the meeting link is for a secure online meeting, determining an encrypted personalized online meeting Uniform Resource Locator (URL) associated with the meeting link and decrypting the encrypted personalized online meeting URL to determine a personalized online meeting URL, the personalized online meeting URL having a query string. The method also includes validating the user based on the query string and, responsive to validation of the user, allowing the user to join the secure online meeting.

In some embodiments, the method also includes, responsive to not validating the user, do not allow the user to join the secure online meeting.

In some embodiments, the query string is an email address associated with the user.

In some embodiments, the query string is a user identifier associated with the user.

In some embodiments, the meeting link is a descriptive link associated with the encrypted personalized online meeting URL.

In some embodiments, the meeting link is included in an invitation, and the method also includes receiving the invitation and, responsive to a determination of an opening of the invitation, disabling a cut/copy/paste function within the opened invitation.

In some embodiments, the meeting link is included in an invitation, and the method also includes receiving the invitation and, responsive to a determination of an opening of the invitation, disabling a print screen function while the invitation is open or disabling a print function within the opened invitation.

In some embodiments, the meeting link is included in an invitation, and the method also includes receiving the invitation and, responsive to a determination of an opening of the invitation, disabling a forwarding function within the opened invitation.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to, responsive to an activation of a meeting link by a user, the meeting link is for a secure online meeting, determine an encrypted personalized online meeting Uniform Resource Locator (URL) associated with the meeting link and decrypt the encrypted personalized online meeting URL to determine a personalized online meeting URL, the personalized online meeting URL having a query string. Execution of the instructions also causes the one or more processors to validate the user based on the query string and, responsive to validation of the user, allow the user to join the secure online meeting.

In some embodiments, execution of the instructions also causes the one or more processors to, responsive to not validating the user, not allow the user to join the secure online meeting.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 1 shows an example online meeting Uniform Resource Locator (URL).

DETAILED DESCRIPTION

Figure 2:
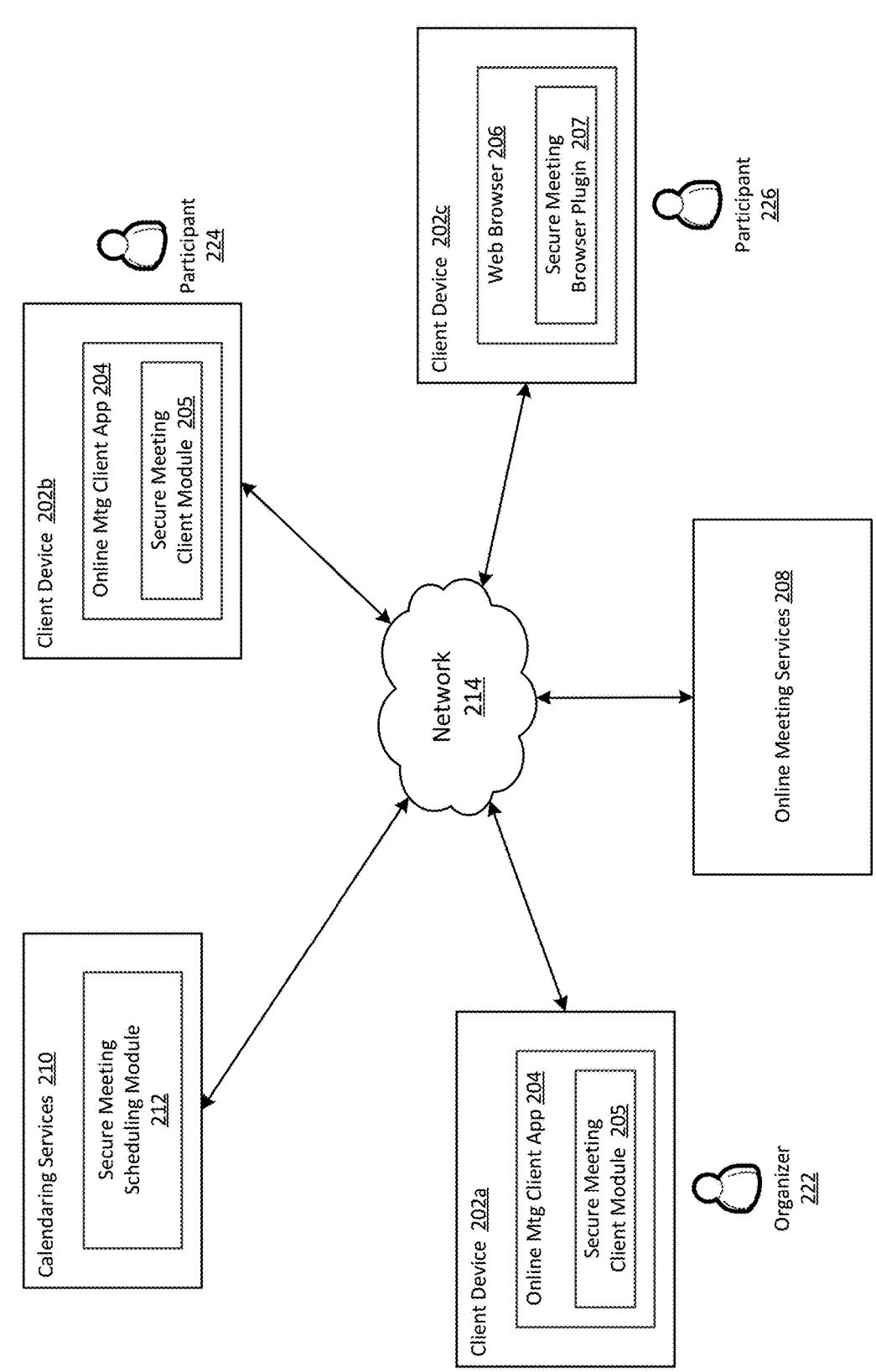
FIG. 2 is a block diagram of an example online meeting system that can be used to provide secure online conferencing, in accordance with an embodiment of the present disclosure.

As noted above, a meeting link is generated for a scheduled online meeting and provided with the meeting invitations (sometimes referred to herein more simply as "invitations" or "invitation" in the singular form) sent to the invited meeting participants. FIG. 1 shows an example of an online meeting Uniform Resource Locator (URL) 100 that may be generated for a scheduled online meeting. For example, an online meeting service, such as TEAMS and ZOOM may generate a unique online meeting URL for each online meeting hosted thereon. Here, online meeting URL 100 is specific to a scheduled online meeting in that it uniquely identifies the scheduled online meeting on the online meeting service. For example, as shown in FIG. 1, online meeting URL 100 may indicate the online meeting service (e.g., "Dell.zoom.us"), identify the online meeting (e.g., "95198759699"), and include a password for joining the identified online meeting (e.g., "amFzKzBxMk4rTG5QRVhTdDhPZThhZz09"). Online meeting URL 100 is provided to the invited meeting participants, and online meeting URL 100 may be used by the meeting participants to join and attend the scheduled online meeting. In other words, the same online meeting URL 100 is used to join the different meeting participants who are attending the scheduled online meeting.

One concern with using an online meeting link (e.g., an online meeting URL) to join the different meeting participants to an online meeting is the potential for use by non-invitees to join and attend the online meeting. For example, a meeting invitee can provide the online meeting link to a person who is not invited to the online meeting by, for example, copying and pasting the online meeting link to a message and sending the message to the uninvited person. As another example, a meeting invitee can forward or otherwise provide the invitation to the online meeting which includes the online meeting link to a person who is not invited to the online meeting. In addition, there are other ways in which a person who is not invited to the online meeting can obtain the online meeting link. In any case, the uninvited person can use the online meeting link and an appropriate meeting application to join and attend the online meeting. While attending the online meeting, the uninvited person (i.e., noninvited participant) will have access to the contents/materials/details/etc., including any sensitive or confidential information, discussed and/or shared during the online meeting. For example, associates (e.g., a business team or a project team) of an organization may be conducting an online meeting during which information that is sensitive or confidential to the organization, such as a future roadmap plan, financial data, customer issues, and/or testing information, to provide a few examples, may be discussed. Here, an uninvited participant who is attending the online meeting will also have access to any sensitive/confidential information discussed and/or shared during the online meeting, thus compromising the sensitive/confidential information.

Concepts, devices, systems, techniques, and structures are disclosed for providing secure online conferencing such as, for example secure online meetings. In brief, a secure online meeting is achieved by generating a personalized online meeting URL for each meeting participant that is invited to a scheduled (i.e., setup) online meeting, and using the personalized online meeting URLs to join the invited meeting participants to the secure online meeting. A personalized online meeting URL generated for a meeting participant that is invited to a secure online meeting can be used to join only that meeting participant (i.e., the meeting participant for whom the personalized online meeting URL was generated) to the secure online meeting. A personalized online meeting URL generated for a meeting participant that is invited to a secure online meeting cannot be used to join another user (e.g., a user or person other than the invited meeting participant for whom the personalized online meeting URL was generated) to the secure online meeting. In this sense, a personalized online meeting URL generated for an invited meeting participant is unique to that specific meeting participant (i.e., is a unique personalized online meeting URL). According to some embodiments disclosed herein, such personalization of an online meeting URL is achieved by appending a query string to an online meeting URL that is typically generated by an online meeting service when an online meeting is scheduled (i.e., a secure online meeting is setup). The personalized online meeting URLs and, more specifically, the query string in the personalized online meeting URLs can be used to validate the users using the personalized online meeting URLs to join a secure online meeting prior to (e.g., as a condition to) allowing the users to join the secure online meeting. Such validation of users inhibits or otherwise prevents use of a personalized online meeting URL by users other than the intended invited meeting participant and, as a result, reduces (and ideally eliminates) the potential for leakage or loss or exposure of secure online meeting contents/materials/details/etc. due to attendance in the secure online meeting by uninvited meeting participants.

Figure 3:
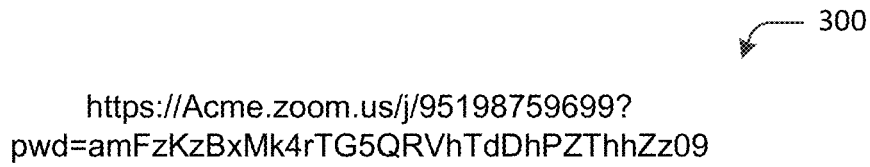
FIG. 3 shows an example online meeting Uniform Resource Locator (URL) of FIG. 1.

In more detail, and in accordance with certain of the embodiments disclosed herein, use of personalized online meeting URLs enable online meetings to be configured in a way that facilitates secure online conferencing (e.g., secure online meetings). For example, an online meeting service can provide a unique online meeting URL when an online meeting is scheduled (i.e., setup). Typically, the online meeting URL is provided to the meeting participants that are invited to the scheduled online meeting for use by the meeting participants to join and attend the online meeting identified by the online meeting URL. FIG. 3 illustrates an example online meeting URL 300 that may be created for a scheduled online meeting. Online meeting URL 300 may be substantially similar to online meeting URL 100 described above with respect to FIG. 1 in that online meeting URL 300 may indicate an online meeting service that will be hosting the identified online meeting, identify the online meeting, and include a password for joining the identified online meeting. However, if an online meeting is scheduled (i.e., setup) as a secure online meeting, the online meeting URL (e.g., online meeting URL 300) provided by the online meeting service is not sent or otherwise provided to the meeting participants that are invited to the secure online meeting. Here, note that online meeting URL 300 can be used by any user to join and attend the online meeting indicated by the online meeting URL.

Rather, according to some embodiments, if the scheduled online meeting is a secure online meeting (i.e., the online meeting is scheduled as a secure online meeting), a calendaring or scheduling service (also referred to herein more simply as a "calendaring service") that is being used to schedule the secure online meeting can generate a unique personalized online meeting URL for each meeting participant that is invited to the secure online meeting. In one example embodiment, a personalized online meeting URL for an invited meeting participant can be generated by appending a query string to the online meeting URL that is provided by the online meeting service. In such embodiments, the query string that is appended to the online meeting URL to generate a personalized online meeting URL for an invited meeting participant may be specific to the invited meeting participant. By appending a query string that is specific to an invited meeting participant to the online meeting URL, the resulting personalized online meeting URL and, more specifically, the appended query string of the personalized online meeting URL can be used to validate a user who is attempting to join the secure online meeting using the personalized online meeting URL. For example, the appended query string can be used to validate that the user who is using the personalized online meeting URL is in fact the invited meeting participant for whom the personalized online meeting URL was generated.

Figure 4:
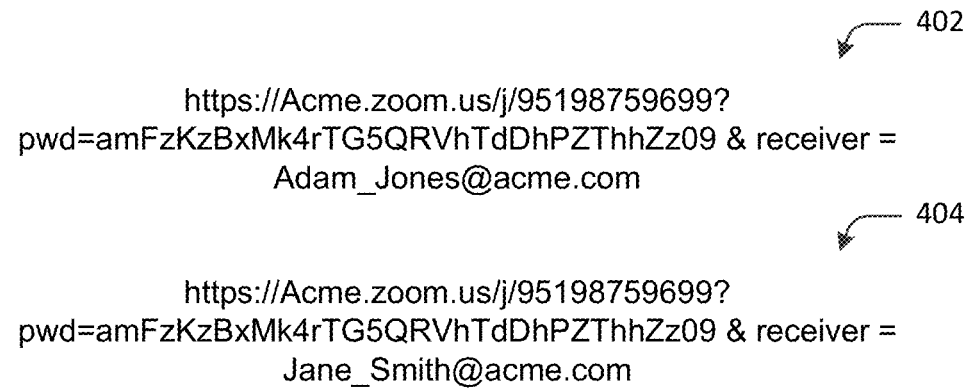
FIG. 4 shows example personalized online meeting Uniform Resource Locators (URLs) generated from the online meeting URL of FIG. 3, in accordance with an embodiment of the present disclosure.

FIG. 4 illustrates two (2) personalized online meeting URLs generated from online meeting URL 300 of FIG. 3, in accordance with an embodiment of the present disclosure. For example, suppose online meeting URL 300 is created for a scheduled secure online meeting. As described previously, online meeting URL 300 is a unique online meeting URL that is generated by an online meeting service for each online meeting hosted thereon. Also suppose that two (2) meeting participants, a Participant A and a Participant B, are to be invited to the scheduled secure online meeting associated with online meeting URL 300. In this example, also suppose that Participant A's email address, "Adam_Jones@acme.com", is a username used by Participant A to register with the online meeting service, and Participant B's email address, "Jane_Smith@acme.com", is a username used by Participant B to register with the online meeting service.

In this example, as can be seen in FIG. 4, a personalized online meeting URL 402 and a personalized online meeting URL 404 can be generated for Participant A and Participant B, respectively. As shown, personalized online meeting URL 402 can be generated by appending Participant A's email address, "Adam_Jones@acme.com", as a query string ("receiver=Adam_Jones@acme.com") to online meeting URL 300 ("https://Acme.zoom.us/j/95198759699?pwd=amFzKzBxMk4rTG5QRVhTdDhPZThhZz09") Note that the email address ("Adam_Jones@acme.com") appended as the query string ("receiver=Adam_Jones@acme.com") in personalized online meeting URL 402 is Participant A's username on the online meeting service. As such, the query string ("receiver=Adam_Jones@acme.com") is specific to (i.e., identifies) Participant A and can be used to validate a user attempting to join the secure online meeting using personalized online meeting URL 402, as will be further described below. Similarly, personalized online meeting URL 404 can be generated by appending Participant B's email address, "Jane_Smith@acme.com", as a query string ("receiver=Jane_Smith@acme.com") to online meeting URL 300. Note that the email address ("Jane_Smith@acme.com") appended as the query string ("receiver=Jane_Smith@acme.com") in personalized online meeting URL 404 is Participant B's username on the online meeting service. As such, the query string ("receiver=Jane_Smith@acme.com") is specific to (i.e., identifies) Participant B and can be used to validate a user attempting to join the secure online meeting using personalized online meeting URL 404.

Although the discussion above uses email addresses as usernames on the online meeting service, it will be appreciated that the online meeting service can use other types of user identifiers (User IDs) different than email addresses. In such cases, the query string can be generated using the other types of user identifiers used by users to register with the online meeting service. Generally, a query string may be generated using any suitable user identifying information that is known by the online meeting service and which can be used to validate a user who is attempting to join a secure online meeting using a personalized online meeting URL.

In some embodiments, the calendaring service can encrypt the personalized online meeting URLs that are generated for the meeting participants that are invited to the secure online meeting. The calendaring service can encrypt the personalized online meeting URLs using any suitable existing or subsequently developed encryption algorithm. For example, in one implementation, the personalized online meeting URL may be encrypted using Advanced Encryption Standard (AES) 128-bit encryption, although other suitable encryption algorithms may be used. The calendaring service can then send to each meeting participant that is invited to the secure online meeting the encrypted personalized online meeting URL (i.e., the encrypted form of the personalized online meeting URL) that was generated for that specific meeting participant. For example, the calendaring service can include the encrypted personalized online meeting URL in a meeting invitation (i.e., an invite) sent to each meeting participant that is invited to the secure online meeting.

Figure 5:
FIG. 5 shows example encrypted personalized online meeting Uniform Resource Locators (URLs) of FIG. 4, in accordance with an embodiment of the present disclosure.

FIG. 5 shows two (2) example encrypted personalized online meeting Uniform Resource Locators (URLs) generated from personalized online meeting URLs 402, 404 of FIG. 4, in accordance with an embodiment of the present disclosure. In particular, an encrypted personalized online meeting URL 502 is generated from personalized online meeting URL 402 and an encrypted personalized online meeting URL 504 is generated from personalized online meeting URL 404. As shown, the text "<Encrypted_Text1>" in encrypted personalized online meeting URL 502 may represent the encrypted form of the text "https://Acme.zoom.us/j/95198759699?pwd=amFzKzBxMk4rTG5QRVhTdDhPZThhZz09 & receiver Adam_Jones@acme.com" in personalized online meeting URL 402. Similarly, the text "<Encrypted_Text2>" in encrypted personalized online meeting URL 504 may represent the encrypted form of the text "https://Acme.zoom.us/j/95198759699?pwd=amFzKzBxMk4rTG5QRVhTdDhPZThhZz09 & receiver Jane_Smith@acme.com" in personalized online meeting URL 404. Continuing the above example, encrypted personalized online meeting URL 502 can be sent to Participant A, and encrypted personalized online meeting URL 504 can be sent to Participant B. For example, as described previously, encrypted personalized online meeting URL 502 can be included in a meeting invitation that is sent to Participant A, and encrypted personalized online meeting URL 504 can be included in a meeting invitation that is sent to Participant B.

In some embodiments, an encrypted personalized online meeting URL can be included in a meeting invitation as a descriptive link. The descriptive link that is included in a meeting invitation does not show the full URL (e.g., an encrypted personalized online meeting URL). The descriptive link included in a meeting invitation sent to an invited meeting participant links to (i.e., is associated with) an encrypted personalized online meeting URL that is generated for that invited meeting participant. The descriptive link included in a meeting invitation may be arbitrary hypertext text. In some cases, the descriptive link included in a meeting invitation may generally describe the secure online meeting associated with the meeting invitation.

Figure 6:
FIG. 6 shows an example descriptive link for a secure online meeting, in accordance with an embodiment of the present disclosure.

Continuing the above example, FIG. 6 illustrates an example descriptive link 600 that may be included in the meeting invitations that are sent to Participant A and Participant B. For example, as can be seen in FIG. 6, descriptive link 600 may be hypertext text (e.g., "Acme Zoom Meeting Link") that describes the secure online meeting to which Participant A and Participant B are invited to attend. In the meeting invitation for Participant A, descriptive link 600 may link to encrypted personalized online meeting URL 502. In the meeting invitation for Participant B, descriptive link 600 may link to encrypted personalized online meeting URL 504.

FIG. 2 is a block diagram of an example online meeting system 200 that can be used to provide secure online conferencing, in accordance with an embodiment of the present disclosure. As shown, online meeting system 200 can include client devices 202*a*-202*c* (sometimes referred to herein more simply as "client devices 202" or "client device 202" in the singular form), a processing device (e.g., a server or other processing device) which functions to provide online meeting services 208, and a processing device (e.g., a server or other processing device) which functions to provide calendaring services 210 communicably coupled to one another via a network 214. Online meeting system 200 may provide services for one or more organizations, with the organizations having one or more users associated with it. A given client device 202 may be assigned to or otherwise associated with a particular user. For example, as shown in FIG. 2, client device 202*a* may be assigned to, or associated with, a user 222 (also referred to herein as an organizer 222), client device 202*b* may be assigned to, or associated with, a user 224 (also referred to herein as a participant 224), and client device 202*c* may be assigned to, or associated with, a user 226 (also referred to herein as a participant 226). While only three client devices 202 and three corresponding users 222, 224, 226 are shown in FIG. 2, the structures and techniques sought to be protected herein can be applied to any number of organizations, users, and devices.

Network 214 may correspond one or more to wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, and Near Field Communication (NFC) networks. In certain embodiments, at least a portion of the functionality associated with network 214 may be provided by a cellular data network, thereby making it easier for users of mobile computing devices to leverage the functionality/services of applications that may be executing on such mobile computing devices. In some embodiments, network 214 may include another network or a portion or portions of other networks.

Online meeting services 208 may provide collaboration and communication functionality to enable online meetings to occur between meeting attendees (sometime referred to herein as "meeting participants" or more simply as "participants") at various locations. For example, users can use computing devices (e.g., client devices 202) to join and attend an online meeting being hosted by online meeting services 208. During such online meetings, documents can be shared and edited, whiteboard sessions can be conducted, tasks can be assigned and tracked, and voice, text chat (e.g., collaboration messaging), instant messaging, and video communications can be conducted, among other features. In one example implementation, online meeting services 208 may be provided by a web server that serves user requests, one or more online meeting applications that provide the respective main application engines for the various services provided by online meeting services 208, and one or more databases that support the application engines. In some embodiments, online meeting services 208 may be a service that is managed by the organization and provided to its users. In other embodiments, some or all of the services provided by online meeting services 208 may be a third-party service(s), for example, provided via resource feed(s) and/or software as a service (SaaS) applications(s).

Calendaring services 210 may coordinate meeting information between meeting participants. Calendaring services 210 may provide scheduling and/or calendaring functionality to schedule online meetings. For example, users can use computing devices (e.g., client devices 202) to schedule online meeting(s) to be hosted by online meeting services 208. In some embodiments, calendaring services 210 may provide both calendaring and email services, such as EXCHANGE. In such embodiments, the meeting invitations (i.e., invites) to online meetings may be in the form of emails. In other embodiments, calendaring services may provide calendaring services and utilize a separate email or other messaging service to send the meeting invitations for the scheduled online meetings (e.g., send out the meeting details, etc.).

Client devices 202 can include smartphones, tablet computers, laptop computers, desktop computers, or other computing devices configured to run user applications (or "apps"). In some embodiments, a client device 202 may be substantially similar to computing device 900 which will be described below in the context of FIG. 9.

Each client device 202 may have installed thereon one or more client applications (sometimes referred to herein more simply as "client apps") such as, for example, an online meeting client app 204 and a web browser 206, among others. For example, as shown in FIG. 2, client devices 202a, 202b may each have installed thereon an online meeting client app 204, and client device 202c may have installed thereon a web browser 206. Such client apps may be configured to execute on client device 202 and facilitate access to services and other network and cloud resources. For example, a user of client device 202 may use a client app (e.g., online meeting client app 204 and/or web browser 206) to access calendaring services 210 to schedule an online meeting, including a secure online meeting, as variously described herein. As another example, a user of client device 202 may use a client app (e.g., online meeting client app 204 and/or web browser 206) to access online meeting services 208 to participate (e.g., join and attend) in an online meeting, including a secure online meeting, as variously described herein.

As a solution to the aforementioned and other technical problems related to use of online meeting URLs by uninvited meeting participants and the potential for compromise of the contents/materials/details/etc. discussed and/or shared during an online meeting, in some embodiments, online meeting system 200 may provide for scheduling and conducting secure online meetings. For example, in some embodiments, the secure online meeting functionality may be implemented via one or more extensions and/or plugins (i.e., software code or a software component(s) that enables an existing application or program to perform a function it could not otherwise perform; stated differently, the extension(s) or plugin(s) adds a specific feature or functionality to an existing application or program) on conventional collaboration services, such as ZOOM, GOTOMEETING, and TEAMS, to provide three examples. To this end, as can be seen in FIG. 2, online meeting client app 204 on client devices 202a, 202b can include a secure meeting client module 205, web browser 206 on client device 202c can include a secure meeting browser plugin 207, and calendaring services 210 can include a secure meeting scheduling module 212. Secure meeting scheduling module 212 may be programmed or otherwise configured to provide for scheduling of (i.e., setting up) secure online meetings. As described previously and elsewhere herein, this can be achieved by generating a unique personalized online meeting URL for each meeting participant that is invited to a secure online meeting. In some cases, the personalized online meeting URLs can be encrypted to provide additional security.

With continued reference to FIG. 2, in an example scenario and embodiment, a meeting organizer 222 can use online meeting client app 204 on client device 202a to schedule a secure online meeting with one or more meeting participants such as, for example, meeting participants 224, 226. In this example scenario, meeting participant 224 may be Participant A and meeting participant 226 may be Participant B discussed above in the context of FIGS. 3-6. When scheduling the secure online meeting, along with providing the needed meeting information (e.g., a scheduled date and time for the meeting, a meeting duration, a list of meeting participants to be invited to the meeting such as the email addresses of the meeting participants that are to be invited, etc.), meeting organizer 222 can specify that the scheduled online meeting is a secure online meeting.

For example, in one implementation, secure meeting client module 205 may provide a user interface (UI) element on a UI of online meeting client app 204 rendered on client device 202a that is capable of receiving input to enable or disable a secure online meeting feature. In some such implementations, the UI element provided on the UI of online meeting client app 204 may be an actionable icon, such as an input dialog box or a check box, that allows a user (e.g., meeting organizer 222) to enable or disable the secure online meeting feature for the online meeting that is being scheduled (i.e., setup). Continuing the above example scenario, meeting organizer 222 can specify that the online meeting that is being scheduled is to be a secure online meeting by enabling the secure online meeting feature. Meeting organizer 222 can then complete or otherwise finish the scheduling of the secure online meeting, causing online meeting client app 204 on client device 202a to send or otherwise provide the scheduled online meeting details, including an indication that the scheduled online meeting is a secure online meeting, to calendaring services 210.

In response to receiving the scheduled online meeting details, calendaring services 210 may obtain from online meeting services 208 an online meeting URL generated for the scheduled online meeting (e.g., online meeting URL 300 of FIG. 3). Secure meeting scheduling module 212 of calendaring services 210 can then check to determine whether the scheduled online meeting is a secure online meeting. For example, as explained above, an indication that the online meeting that is being scheduled is a secure online meeting may be included in the scheduled online meeting details provided by online meeting client app 204. If it is determined that the scheduled online meeting is not a secure online meeting, calendaring services 210 can send a meeting invitation (i.e., a meeting invite) to the individual meeting participants that are invited to the online meeting (e.g., participants 224, 226), as conventionally done. For example, the meeting invitation may be in the form of an email. The meeting invitation can carry or otherwise include information regarding the scheduled online meeting and the online meeting URL for the scheduled online meeting. For example, the online meeting URL for the scheduled online meeting may be provided in the meeting invitation as a link that can be activated (e.g., clicked, tapped, or selected) to join the online meeting.

Otherwise, if it is determined that the scheduled online meeting is a secure online meeting, the online meeting URL obtained from online services 208 for the scheduled online meeting (e.g., online meeting URL 300 of FIG. 3) is not provided with the meeting invitations as is conventionally done. Rather, according to some embodiments, secure meeting scheduling module 212 can generate a unique personalized online meeting URL for each meeting participant that is invited to the secure online meeting. For example, secure meeting scheduling module 212 can generate a personalized online meeting URL for each invited meeting participant by appending a query string to the online meeting URL that was obtained from online services 208 for the online meeting. For example, in one implementation, secure meeting scheduling module 212 can generate a personalized online meeting URL for an invited meeting participant by appending an email address (i.e., a username on online meeting services 208) of that invited meeting participant as a query string to the online meeting URL.

Continuing the above example scenario, secure meeting scheduling module 212 can append an email address of meeting participant 224 (e.g., "Adam_Jones@acme.com") as a query string (e.g., "receiver=Adam_Jones@acme.com") to the online meeting URL (e.g., online meeting URL 300 of FIG. 3) to generate a personalized online meeting URL for meeting participant 224 (e.g., personalized online meeting URL 402 of FIG. 4). Similarly, secure meeting scheduling module 212 can append an email address of meeting participant 226 (e.g., "Jane_Smith@acme.com") as a query string (e.g., "receiver=Jane_Smith@acme.com") to the online meeting URL (e.g., online meeting URL 300 of FIG. 3) to generate a personalized online meeting URL for meeting participant 226 (e.g., personalized online meeting URL 404 of FIG. 4).

In some embodiments, secure meeting scheduling module 212 can encrypt the personalized online meeting URLs that are generated for each invited meeting participant. For example, secure meeting scheduling module 212 can encrypt the personalized online meeting URLs using any suitable existing or subsequently developed encryption algorithm such as AES 128-bit encryption. Secure meeting scheduling module 212 can then send to each invited meeting participant their respective encrypted personalized online meeting URL. The individual encrypted personalized online meeting URLs can be sent with meeting invitations to the secure online meeting. In some embodiments, an encrypted personalized online meeting URL can be included in a meeting invitation as a descriptive link that links to the encrypted personalized online meeting URL. The descriptive link in a meeting invitation does not show the full encrypted personalized online meeting URL to which it is linked. Rather, the descriptive link may provide a description of the scheduled secure online meeting.

Continuing the above example scenario, secure meeting scheduling module 212 can encrypt the personalized online meeting URL that is generated for meeting participant 224 (e.g., personalized online meeting URL 402 of FIG. 4). Secure meeting scheduling module 212 can then send the encrypted personalized online meeting URL (e.g., encrypted personalized online meeting URL 502 of FIG. 5) with a meeting invitation that is sent to meeting participant 224. The meeting invitation may include a descriptive link (e.g., descriptive link 600 of FIG. 6) that links to meeting participant 224's encrypted personalized online meeting URL (e.g., encrypted personalized online meeting URL 502 of FIG. 5) such that meeting participant 224 can join the secure online meeting using the encrypted personalized online meeting URL (e.g., by clicking on the descriptive link included in the meeting invitation). Note that when the descriptive link is clicked, the URL linked to by the descriptive link is read and processed. Thus, clicking on the descriptive link (e.g., descriptive link 600 of FIG. 6) included in the meeting invitation that is sent to meeting participant 224 causes meeting participant 224's encrypted personalized online meeting URL (e.g., encrypted personalized online meeting URL 502 of FIG. 5) to be read and processed.

Similarly, secure meeting scheduling module 212 can encrypt the personalized online meeting URL that is generated for meeting participant 226 (e.g., personalized online meeting URL 404 of FIG. 4). Secure meeting scheduling module 212 can then send the encrypted personalized online meeting URL (e.g., encrypted personalized online meeting URL 504 of FIG. 5) with a meeting invitation that is sent to meeting participant 226. The meeting invitation may include a descriptive link (e.g., descriptive link 600 of FIG. 6) that links to meeting participant 226's encrypted personalized online meeting URL (e.g., encrypted personalized online meeting URL 504 of FIG. 5) such that meeting participant 226 can join the secure online meeting using the using the encrypted personalized online meeting URL (e.g., by clicking on the descriptive link included in the meeting invitation). Here, clicking on the descriptive link (e.g., descriptive link 600 of FIG. 6) included in the meeting invitation that is sent to meeting participant 226 causes meeting participant 226's encrypted personalized online meeting URL (e.g., encrypted personalized online meeting URL 504 of FIG. 5) to be read and processed.

An invited meeting participant (e.g., meeting participant 224, 226) can use a suitable computing device (e.g., client device 202b, 202c) to open the meeting invitation that is sent to the invited meeting participant. For example, in the case where the meeting invitation is in the form of an email, an invited meeting participant can use an appropriate email application on the computing device to open the email (i.e., the meeting invitation). The invited meeting participant, for instance, may open the email to view the invitation, accept the invitation, decline the invitation, among others. Applications that may be utilized to open the meeting invitation, such as an email application, typically include various UI controls (e.g., buttons or other type of controls) that enable a user to perform operations on the contents of a meeting invitation when the meeting invitation is opened. For example, the UI controls can include buttons or other controls (e.g., keyboard controls) for cutting/copying/pasting, printing (e.g., print and/or print screen), and forwarding the opened meeting invitation and/or contents of the meeting invitation. It is appreciated herein that performing such operations can cause leakage/loss/exposure of information contained in the meeting invitation, such as the personalized online meeting URL and/or the encrypted personalized online meeting URL.

In some embodiments, a module, such as a plugin or extension to an email application, for example, on the computing device may be programmed or otherwise configured to disable the UI controls for performing such operations in response to (e.g., subsequent to) determining that an open meeting invitation is an invitation to a secure online meeting. For example, a description (or other suitable indicator) in the meeting invitation may indicate whether the scheduled online meeting is or is not a secure online meeting. The email application and/or an operating system (OS) on the computing device may provide controls, which may be accessible via an Application Programming Interface (API) or other interface, for enabling and disabling such UI controls.

For example, when a meeting invitation (e.g., an email containing the meeting invitation) is opened on the computing device, the module can determine whether the opened meeting invitation is for a secure online meeting. For example, the module can make this determination based (e.g., from) the description (or other suitable indicator) in the meeting invitation (e.g., the description in the meeting invitation may indicate that the invitation is for a secure online meeting). In response to a determination that the opened meeting invitation is for a secure online meeting, the module can send a command through the provided API or other interface to disable the cut/copy/paste function within the opened meeting invitation. Disabling the cut/copy/paste function within the opened meeting invitation prevents a user from cutting/copying/pasting the contents, including a descriptive link (or an encrypted personalized online meeting URL or a personalized online meeting URL), of the opened meeting invitation. That is, when the cut/copy/paste function is disabled within the opened meeting invitation, the user is not able to cut/copy/paste any content, including the descriptive link, in the opened meeting invitation. As another example, in response to a determination that the opened meeting invitation is for a secure online meeting, the module can send a command through the provided API or other interface to disable the print screen function of the computing device. Disabling the print screen function when a meeting invitation is opened on the computing device prevents a user from printing the contents, including the contents of the opened meeting invitation, which are displayed on a screen of the computing device. As still another example, in response to a determination that the opened meeting invitation is for a secure online meeting, the module can send a command through the provided API or other interface to disable the print function within the opened meeting invitation. Disabling the print function within the opened meeting invitation prevents a user from printing the contents, including a descriptive link, of the opened meeting invitation. As yet another example, in response to a determination that the opened meeting invitation is for a secure online meeting, the module can send a command through the provided API or other interface to disable the forwarding function within the opened meeting invitation. Disabling the forwarding function within the opened meeting invitation prevents a user from forwarding the meeting invitation, including a descriptive link included in the meeting invitation, to another user (e.g., an uninvited user).

It will be understood that other applications (e.g., an online meeting client application of online meeting services 208) which may be used to open the meeting invitations may also include UI controls (e.g., buttons or other type of controls) that enable a user to perform operations on the contents of a meeting invitation when the meeting invitation is opened. Similar to the email application discussed above, these applications may also provide controls, which may be accessible via an API or other interface, for enabling and disabling such UI controls. Thus, when a meeting invitation to a secure online meeting is opened using such applications a module, which may be implemented as a plugin or extension to such applications, can send a command through the provided API or other interface to disable the cut/copy/paste function, the print screen function, the print function, and/or the forwarding function.

With continued reference to FIG. 2, secure meeting client module 205 may be programmed or otherwise configured to provide processing of personalized online meeting URLs and, in some cases, encrypted personalized online meeting URL to join to a secure online meeting. In some embodiments, secure meeting client module 205 may be implemented as a plugin or extension to online meeting client app 204. In one implementation, when a user uses online meeting client app 204 and activates (e.g., clicks, taps, or selects) a link (e.g., a descriptive link) included in a meeting invitation to join an online meeting, secure meeting client module 205 can check to determine whether the activated link is for a secure online meeting. For example, secure meeting client module 205 can make this determination based on the form of the URL that is linked to the activated link (e.g., the URL to a secure online meeting is an encrypted personalized online meeting URL or is a personalized online meeting URL). If the activated link is not for a secure online meeting (e.g., the activated link is for a non-secure online meeting), secure meeting client module 205 can allow conventional processing of the activated link by online meeting client app 204. For example, secure online meeting client module 205 may return control to online meeting client app 204, and online meeting client app 204 can process the activation of the link, as conventionally done.

Otherwise, if the activated link is for a secure online meeting, secure meeting client module 205 can read the encrypted personalized online meeting URL that is linked to the activated link. Secure meeting client module 205 can then decrypt the encrypted personalized online meeting URL to recover or otherwise obtain the personalized online meeting URL corresponding to the encrypted personalized online meeting URL (i.e., the decrypted form of the encrypted personalized online meeting URL). For example, secure meeting client module 205 may decrypt the encrypted personalized online meeting URL using the same encryption algorithm used by secure meeting scheduling module 212 of calendaring services 210 to generate the encrypted personalized online meeting URL. Secure meeting client module 205 can then parse/scan the personalized online meeting URL to extract the query string included in the personalized online meeting URL and validate the user who activated the link using the extracted query string. For example, secure meeting client module 205 may obtain the username that was used by the user to register with (e.g., login to) online meeting services 208 and determine whether the obtained username matches the query string (i.e., the email address extracted from the personalized online meeting URL). For example, secure meeting client module 205 may obtain the username from online meeting services 208 using an API or other interface provided by online meeting services 208.

If the obtained username (e.g., the email address) matches (e.g., is the same as) the query string extracted from the personalized online meeting URL (i.e., the email address in the query string), secure meeting client module 205 can validate the user who activated the link as the meeting participant to whom the activated link (e.g., the encrypted personalized online meeting URL linked to by the activated link) was sent to. In other words, if there is a match between the obtained username and the extracted query string, secure meeting client module 205 can conclude that the user who activated the link is a meeting participant that is invited to the secure online meeting. Upon validating the user, secure meeting client module 205 can parse/scan the personalized online meeting URL to extract the online meeting URL from the personalized online meeting URL. Secure meeting client module 205 can then redirect to the extracted online meeting URL to allow the user to join the secure online meeting.

Otherwise, if the obtained username does not match (e.g., is not the same as) the query string extracted from the personalized online meeting URL (i.e., the email address in the query string), secure meeting client module 205 does not validate the user who activated the link as a meeting participant that is invited to the secure online meeting. Here, since the obtained username and the extracted query string do not match (e.g., are not the same), secure meeting client module 205 can conclude that the user who activated the link is a user that is not invited to the secure online meeting. In this case, secure meeting client module 205 does not redirect to the online meeting URL in the personalized online meeting URL and the user is not joined to the secure online meeting. In some embodiments, secure meeting client module 205 can report and/or log the failed validation of the user as an error condition. For example, the failed validation may be reported to online meeting services 208.

Secure meeting browser plugin 207 may be programmed or otherwise configured to provide processing of personalized online meeting URLs and, in some cases, encrypted personalized online meeting URL to join to a secure online meeting. For example, when a user when a user activates (e.g., clicks, taps, or selects) a link (e.g., a descriptive link) included in an email message to join an online meeting (e.g., the meeting invitation is in the form of an email), the activated link may open in a web browser (e.g., web browser 206). In this case, secure meeting browser plugin 207 can process the activation of the link to join an online meeting. In embodiments, the processing of the activated link by secure meeting browser plugin 207 may be substantially similar to the processing performed by secure meeting client module 205 described above and elsewhere herein, and that relevant discussion is equally applicable to secure meeting browser plugin 207 and will not be described again for the purpose of clarity.

Continuing the above example scenario, at the scheduled time of the secure online meeting, meeting participant 224 can use online meeting client app 204 on client device 202*b* to join the secure online meeting. To do so, meeting participant 224 can activate the link (e.g., descriptive link 600 of FIG. 6) included in the meeting invitation received by meeting participant 224. Upon meeting participant 224 activating the link, secure meeting client module 205 on client device 202*b* can determine that the activated link (e.g., descriptive link 600 of FIG. 6) is for a secure online meeting. Secure meeting client module 205 can then read the encrypted personalized online meeting URL (e.g., encrypted personalized online meeting URL 502 of FIG. 5) that is linked to the activated link. Secure meeting client module 205 can then decrypt the encrypted personalized online meeting URL (e.g., encrypted personalized online meeting URL 502 of FIG. 5) to recover the personalized online meeting URL (e.g., personalized online meeting URL 402 of FIG. 4) corresponding to the encrypted personalized online meeting URL. Secure meeting client module 205 can then parse/scan the personalized online meeting URL (e.g., personalized online meeting URL 402 of FIG. 4) to extract the query string (e.g., "receiver=Adam_Jones@acme.com") included in the personalized online meeting URL. Secure meeting client module 205 can then validate meeting participant 224 based on the extracted query string. To do so, secure meeting client module 205 can obtain the username or other user identifier that was used by meeting participant 224 (i.e., the user that activated the link) to register with online meeting services 208. Note that the obtained username may be an email address used by meeting participant 224 to login to online meeting services 208. Secure meeting client module 205 can then determine whether the obtained username or other user identifier (e.g., the email address used to login to online meeting services 208) matches the email address (e.g., "Adam_Jones@acme.com") in the extracted query string (e.g., "receiver=Adam_Jones@acme.com"). If the obtained username or other user identifier and the email address in the extracted query string match, secure meeting client module 205 can validate meeting participant 224 and redirect to the online meeting URL (e.g., "https://Acme.zoom.us/j/95198759699?pwd=amFzKzBxMk4r TG5QRVhTdDhPZThhZz09") in the personalized online meeting URL (e.g., personalized online meeting URL 402 of FIG. 4) to allow meeting participant 224 to join and attend the secure online meeting.

With continued reference to the above example scenario, at the scheduled time of the secure online meeting, meeting participant 226 can use client device 202*c* to join the secure online meeting. To do so, meeting participant 226 can activate the link (e.g., descriptive link 600 of FIG. 6) included in the meeting invitation received by meeting participant 226. This may cause the activated link to open in web browser 206 on client device 202*c* (e.g., a new tab in web browser 206). Secure meeting browser plugin 207 on client device 202*c* can determine that the activated link (e.g., descriptive link 600 of FIG. 6) is for a secure online meeting. Secure meeting browser plugin 207 can then read the encrypted personalized online meeting URL (e.g., encrypted personalized online meeting URL 504 of FIG. 5) that is linked to the activated link Secure meeting browser plugin 207 can then decrypt the encrypted personalized online meeting URL (e.g., encrypted personalized online meeting URL 504 of FIG. 5) to recover the personalized online meeting URL (e.g., personalized online meeting URL 404 of FIG. 4) corresponding to the encrypted personalized online meeting URL. Secure meeting browser plugin 207 can then parse/scan the personalized online meeting URL (e.g., personalized online meeting URL 404 of FIG. 4) to extract the query string (e.g., "receiver=Jane_Smith@acme.com") included in the personalized online meeting URL. Secure meeting browser plugin 207 can then validate meeting participant 226 based on the extracted query string. To do so, secure meeting browser plugin 207 can obtain the username or other user identifier that was used by meeting participant 226 (i.e., the user that activated the link) to register with online meeting services 208. Note that the obtained username may be an email address used by meeting participant 226 to login to online meeting services 208. Secure meeting browser plugin 207 can then determine whether the obtained username or other user identifier (e.g., the email address used to login to online meeting services 208) matches the email address (e.g., "Jane_Smith@acme.com") in the extracted query string (e.g., "receiver=Jane_Smith@acme.com"). If the obtained username or other user identifier and the email address in the extracted query string match, secure meeting browser plugin 207 can validate meeting participant 226 and redirect to the online meeting URL (e.g., "https://Acme.zoom.us/j/95198759699?pwd=amFzKzBxMk4rT G5QRVhTdDhPZThhZz09") in the personalized online meeting URL (e.g., personalized online meeting URL 404 of FIG. 4) to allow meeting participant 226 to join and attend the secure online meeting.

In some embodiments, secure meeting client module 205 may include a sub-module or other component that is programmed or otherwise configured to monitor messages (e.g., chat messages) during the secure online meeting and obfuscate sensitive information included in the messages. For example, when a chat message is received for display on a screen of a meeting attendee's client device, the sub-module can scan the content (e.g., textual data) for certain keywords or phrases, and/or search the textual data using regular expressions, for patterns of characters to identify items of sensitive information contained in the chat message. Non-limiting examples of sensitive information include personally identifiable information (PII), protected health information (PHI), financial information for an individual/organization, and information deemed confidential by the individual/organization. Other examples of sensitive information can include contracts, sales quotes, customer contact information (e.g., email addresses), phone numbers, personal information about employees, employee compensation information, etc. Other pattern recognition techniques may be used to identify items of sensitive information. Upon identifying sensitive information in a chat message, the sub-module can obfuscate the identified sensitive information causing the sensitive information contained in the chat message to be displayed in obfuscated form. For example, sensitive information may be obfuscated by applying an overlay with sufficient distortion effects (e.g., a black-out box), applying a transformation (e.g., replacing some or all of the text with one or more asterisks ("*")), adding artifacts, and/or redaction, to prevent viewing of the sensitive information.

Figure 7:
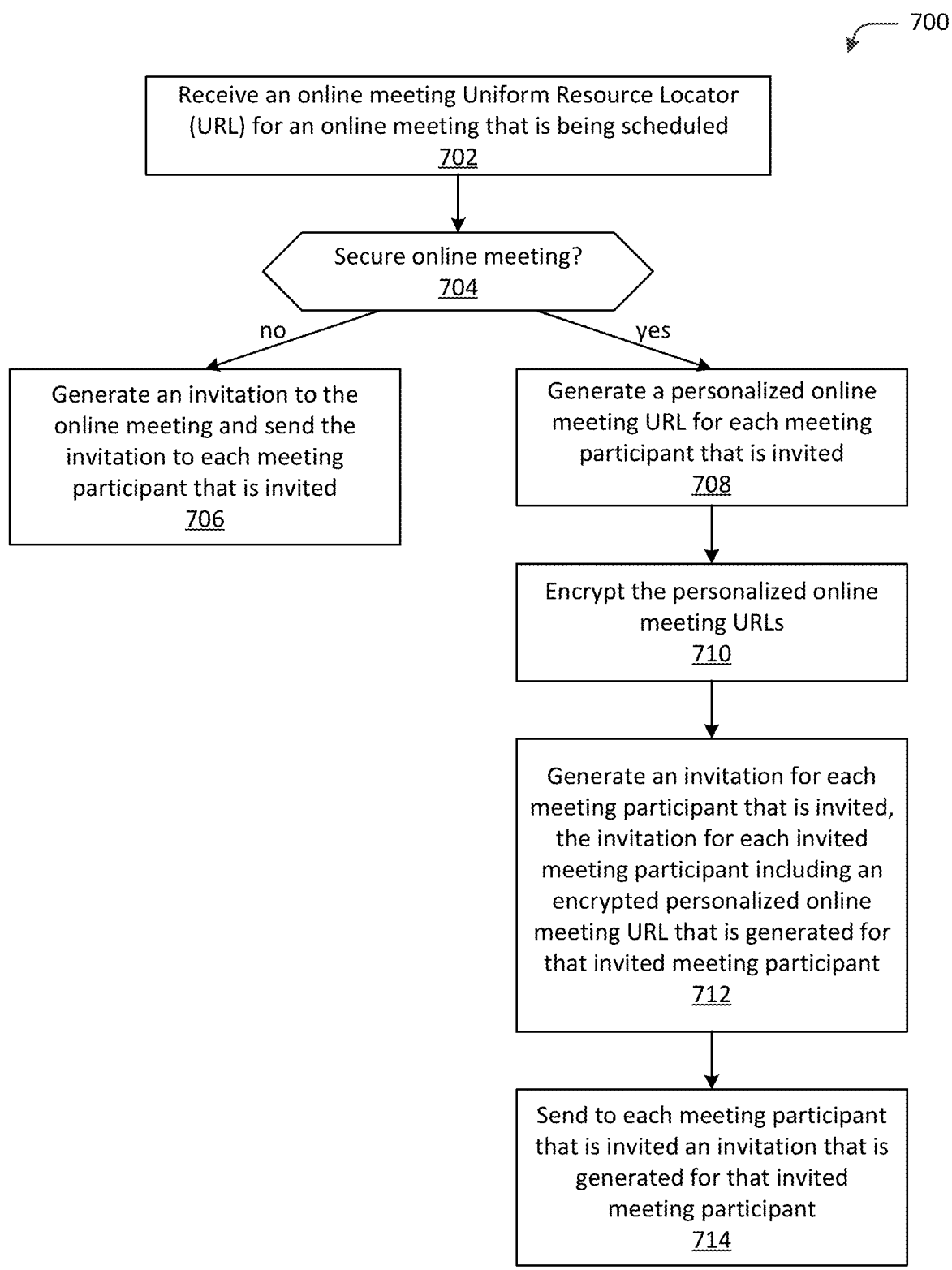
FIG. 7 is a flow diagram of an example process for scheduling a secure online meeting, in accordance with an embodiment of the present disclosure.

FIG. 7 is a flow diagram of an example process 700 for scheduling a secure online meeting, in accordance with an embodiment of the present disclosure. Example process 700, and example process 800 further described below, may be implemented or performed by any suitable hardware, or combination of hardware and software, including without limitation the system shown and described with respect to FIG. 2, the computing device shown and described with respect to FIG. 9, or a combination thereof. For example, in some embodiments, the operations, functions, or actions illustrated in example process 700, and example process 800 further described below, may be performed, for example, in whole or in part by components, such as online meeting client app 204, secure meeting client module 205, web browser 206, secure meeting browser plugin 207, online meeting services 208, calendaring services 210, and secure meeting scheduling module 212, of online meeting system 200 described with respect to FIG. 2.

With reference to process 700 of FIG. 7, and in an illustrative use case, a meeting organizer (e.g., meeting organizer 222 of FIG. 2) may be scheduling a secure online meeting to be hosted by a collaboration service (e.g., online meeting services 208 of FIG. 2). At 702, a calendaring service that is being used to schedule the online meeting (e.g., calendaring services 210 of FIG. 2) can receive (i.e., obtain) an online meeting URL for the online meeting from the collaboration service (e.g., online meeting services 208 of FIG. 2).

At 704, a component of the calendaring service (e.g., secure meeting scheduling module 212 of FIG. 2) can determine whether the online meeting being scheduled is to be a secure online meeting. If it is determined that the online meeting being scheduled is not a secure online meeting (e.g., the online meeting is to be scheduled as a non-secure online meeting), then, at 706, the calendaring service (e.g., calendaring services 210 of FIG. 2) can schedule the online meeting as conventionally done. For example, the calendaring service can generate an invitation to the online meeting and send the invitation to each meeting participant that is invited to the online meeting.

Otherwise, if it is determined that the online meeting being scheduled is a secure online meeting (e.g., the online meeting is to be scheduled as a secure online meeting), then, at 708, the component of the calendaring service (e.g., secure meeting scheduling module 212 of FIG. 2) can generate a personalized online meeting URL for each meeting participant that is invited to the secure online meeting. In some embodiments, the component of the calendaring service (e.g., secure meeting scheduling module 212 of FIG. 2) can generate each personalized online meeting URL by appending a query string to the online meeting URL, as previously described herein.

At 710, the component of the calendaring service (e.g., secure meeting scheduling module 212 of FIG. 2) can encrypt the personalized online meeting URLs to generate encrypted personalized online meeting URLs for the meeting participants that are invited to the secure online meeting. An encrypted personalized online meeting URL is generated for each meeting participant that is invited to the secure online meeting.

At 712, the component of the calendaring service (e.g., secure meeting scheduling module 212 of FIG. 2) can generate an invitation that is to be sent to each meeting participant that is invited to the secure online meeting. The generated meeting invitations are for the secure online meeting. An invitation that is to be sent to each invited meeting participant includes the encrypted personalized online meeting URL that is generated for that invited meeting participant. In some embodiments, the component of the calendaring service (e.g., secure meeting scheduling module 212 of FIG. 2) can include the encrypted personalized online meeting URL in each invitation as a descriptive link that links to the encrypted personalized online meeting URL.

At 714, the component of the calendaring service (e.g., secure meeting scheduling module 212 of FIG. 2) can send to each meeting participant that is invited an invitation that is generated for that invited meeting participant.

In some embodiments, the component of the calendaring service (e.g., secure meeting scheduling module 212 of FIG. 2) may not perform the encryption of the personalized online meeting URLs. In such embodiments, the descriptive link that is included in the invitations can link to a personalized online meeting URL and not an encrypted personalized online meeting URL as described above.

Figure 8:
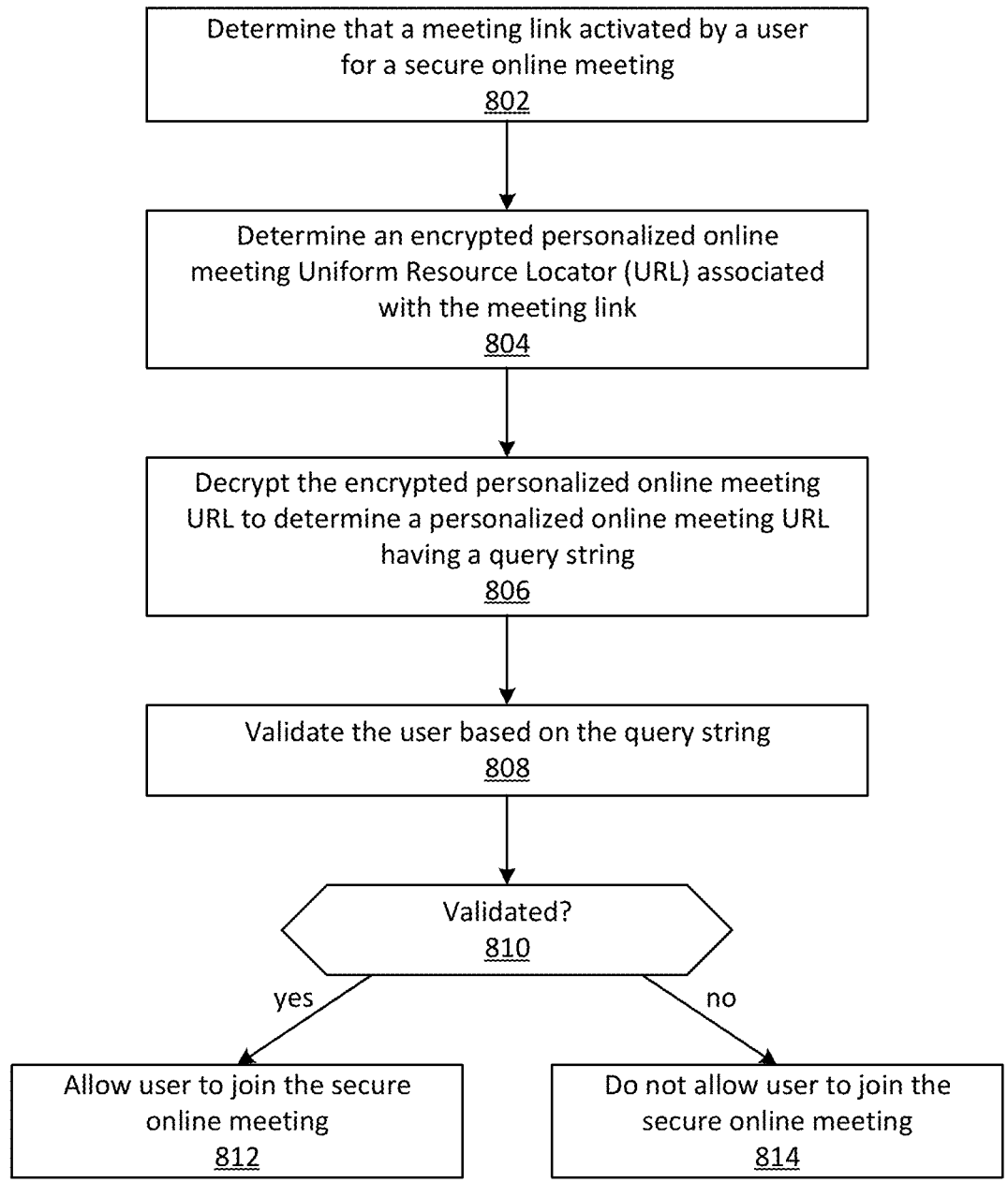
FIG. 8 is a flow diagram of an example process for a user (e.g., meeting participant) joining a secure online meeting, in accordance with an embodiment of the present disclosure.

FIG. 8 is a flow diagram of an example process 800 for a user (e.g., meeting participant) joining a secure online meeting, in accordance with an embodiment of the present disclosure. For example, in an illustrative use case, a user (e.g., meeting participant 224 or 226 of FIG. 2) may use a computing device (e.g., client device 202b or 202c of FIG. 2) and activate a link included in an invitation to join an online meeting (e.g., a secure online meeting). At 802, an application on the computing device (e.g., secure meeting client module 205 or secure meeting browser plugin 207) can determine that the activated link is for a secure online meeting. For example, the application can make this determination from the form of the URL that is linked to the activated link (e.g., the URL to a secure online meeting is an encrypted personalized online meeting URL or is a personalized online meeting URL).

At 804, the application (e.g., secure meeting client module 205 or secure meeting browser plugin 207) can determine an encrypted personalized online meeting URL that is associated with the activated link. For example, the application can read the URL that is linked to the activated link to determine the encrypted personalized online meeting URL associated with the activated link.

At 806, the application (e.g., secure meeting client module 205 or secure meeting browser plugin 207) can decrypt the encrypted personalized online meeting URL to determine a personalized online meeting URL. The personalized online meeting URL includes a query string. The encrypted personalized online meeting URL can be decrypted using the encryption algorithm that was used to generate the encrypted personalized online meeting URL.

At 808, the application (e.g., secure meeting client module 205 or secure meeting browser plugin 207) can validate the user that activated the link based on the query string included in the personalized online meeting URL. For example, the application can extract the query string from the personalized online meeting URL and validate the user, as previously described herein.

At 810, if the user is validated, then, at 812, the application (e.g., secure meeting client module 205 or secure meeting browser plugin 207) can allow the user to join the secure online meeting. Here, the application can extract the online meeting URL from the personalized online meeting URL and redirect to the online meeting URL.

Otherwise, if the user is not validated, then, at 814, the application (e.g., secure meeting client module 205 or secure meeting browser plugin 207) can allow the user to join the secure online meeting. In some embodiments, the application can report and/or log the failed validation of the user as an error condition (e.g., with a collaboration service that is hosting the secure online meeting).

Figure 9:
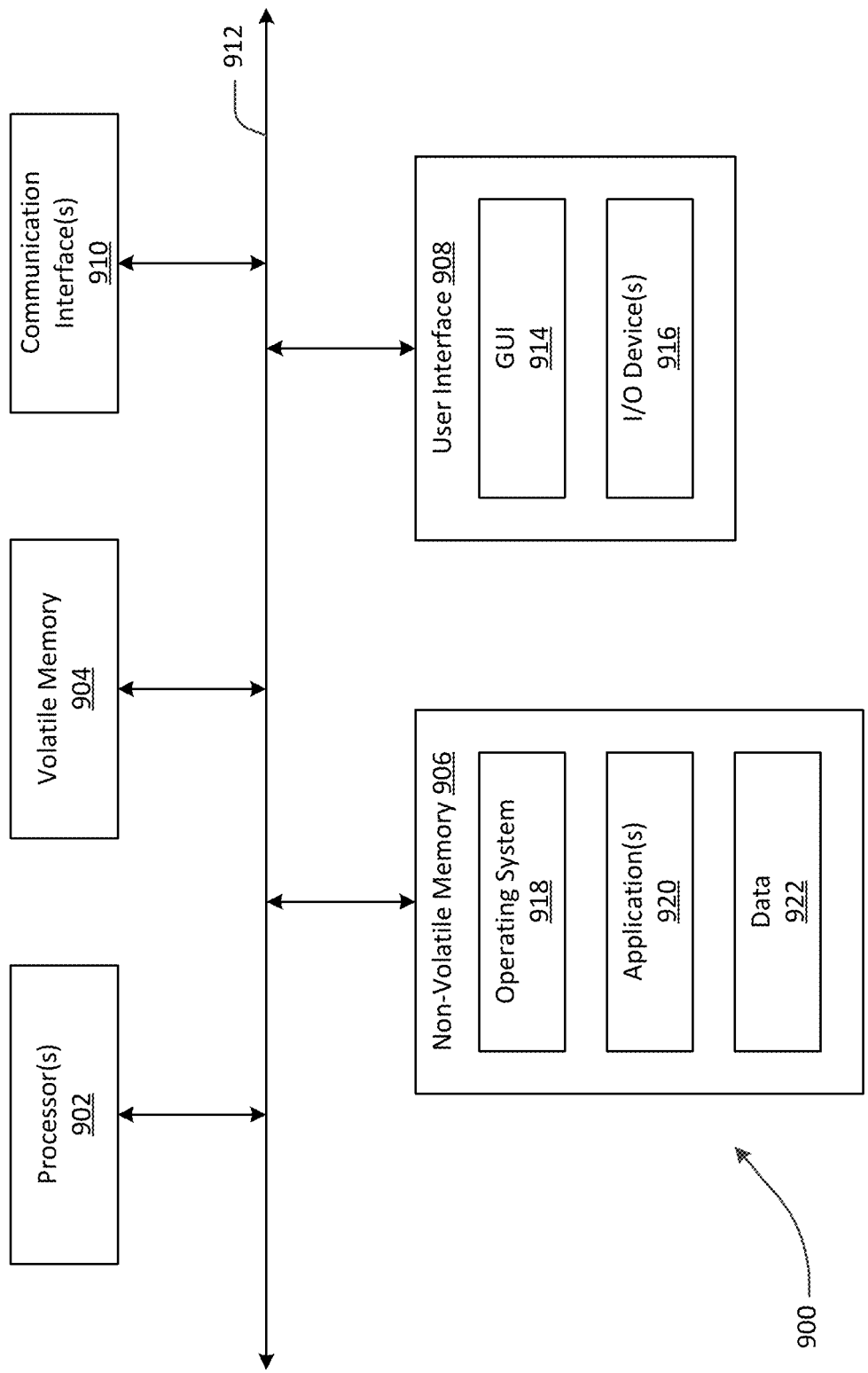
FIG. 9 is a block diagram illustrating selective components of an example computing device in which various aspects of the disclosure may be implemented, in accordance with an embodiment of the present disclosure.

FIG. 9 is a block diagram illustrating selective components of an example computing device 900 in which various aspects of the disclosure may be implemented, in accordance with an embodiment of the present disclosure. As shown, computing device 900 includes one or more processors 902, a volatile memory 904 (e.g., random access memory (RAM)), a non-volatile memory 906, a user interface (UI) 908, one or more communications interfaces 910, and a communications bus 912.

Non-volatile memory 906 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 908 may include a graphical user interface (GUI) 914 (e.g., a touchscreen, a display, etc.) and one or more input/output (I/O) devices 916 (e.g., a mouse, a keyboard, a microphone, one or more speakers, one or more cameras, one or more biometric scanners, one or more environmental sensors, and one or more accelerometers, etc.).

Non-volatile memory 906 stores an operating system 918, one or more applications 920, and data 922 such that, for example, computer instructions of operating system 918 and/or applications 920 are executed by processor(s) 902 out of volatile memory 904. In one example, computer instructions of operating system 918 and/or applications 920 are executed by processor(s) 902 out of volatile memory 904 to perform all or part of the processes described herein (e.g., processes illustrated and described in reference to FIGS. 2 through 8). In some embodiments, volatile memory 904 may include one or more types of RAM and/or a cache memory that may offer a faster response time than a main memory. Data may be entered using an input device of GUI 914 or received from I/O device(s) 916. Various elements of computing device 900 may communicate via communications bus 912.

The illustrated computing device 900 is shown merely as an illustrative client device or server and may be implemented by any computing or processing environment with any type of machine or set of machines that may have suitable hardware and/or software capable of operating as described herein.

Processor(s) 902 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 902 may be analog, digital or mixed signal. In some embodiments, processor 1102 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 910 may include one or more interfaces to enable computing device 900 to access a computer network such as a Local Area Network (LAN), a Wide Area Network (WAN), a Personal Area Network (PAN), or the Internet through a variety of wired and/or wireless connections, including cellular connections.

In described embodiments, computing device 900 may execute an application on behalf of a user of a client device. For example, computing device 900 may execute one or more virtual machines managed by a hypervisor. Each virtual machine may provide an execution session within which applications execute on behalf of a user or a client device, such as a hosted desktop session. Computing device 900 may also execute a terminal services session to provide a hosted desktop environment. Computing device 900 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A computer implemented method comprising:
   receiving an online meeting Uniform Resource Locator (URL) for an online meeting that is being scheduled;
   determining whether the online meeting is a secure online meeting; and
   responsive to a determination that the online meeting is a secure online meeting:
      generating a personalized online meeting URL for each meeting participant that is invited to the secure online meeting, the personalized online meeting URL being based on the online meeting URL;
      encrypting the generated personalized online meeting URLs; and
      sending to each meeting participant that is invited an invitation to the secure online meeting, the invitation to each invited meeting participant including an encrypted personalized online meeting URL that is generated for that invited meeting participant; and
      responsive to a determination of an opening of one of the sent invitations, disabling one or more functions within the opened invitation to prevent sending of the invitation to an uninvited user.

2. The method of claim 1, wherein generating a personalized online meeting URL for each meeting participant that is invited comprises appending a query string to the online meeting URL, the query string being specific to each meeting participant.

3. The method of claim 2, wherein the query string is used to validate a meeting participant requesting to join the secure online meeting.

4. The method of claim 2, wherein the query string specific to the invited meeting participant is an email address associated with the invited meeting participant.

5. The method of claim 2, wherein the query string specific to the invited meeting participant is a user identifier associated with the invited meeting participant.

6. The method of claim 1, wherein the encrypted personalized online meeting URL is included in the invitation as a descriptive link.

7. A system comprising:
one or more non-transitory machine-readable mediums configured to store instructions; and
one or more processors configured to execute the instructions stored on the one or more non-transitory machine-readable mediums, wherein execution of the instructions causes the one or more processors to:
receive an online meeting Uniform Resource Locator (URL) for an online meeting that is being scheduled;
determine whether the online meeting is a secure online meeting; and
responsive to a determination that the online meeting is a secure online meeting:
generate a personalized online meeting URL for each meeting participant that is invited to the secure online meeting, the personalized online meeting URL being based on the online meeting URL;
encrypt the generated personalized online meeting URLs;
send to each meeting participant that is invited an invitation to the secure online meeting, the invitation to each invited meeting participant including an encrypted personalized online meeting URL that is generated for that invited meeting participant; and
responsive to a determination of an opening of one of the sent invitations, disabling one or more functions within the opened invitation to prevent sending of the invitation to an uninvited user.

8. The system of claim 7, wherein to generate a personalized online meeting URL for each meeting participant that is invited comprises to append a query string to the online meeting URL, the query string being specific to each meeting participant.

9. The system of claim 8, wherein the query string is used to validate a meeting participant requesting to join the secure online meeting.

10. The system of claim 8, wherein the query string specific to the invited meeting participant is an email address associated with the invited meeting participant.

11. The system of claim 8, wherein the query string specific to the invited meeting participant is a user identifier associated with the invited meeting participant.

12. The system of claim 7, wherein the encrypted personalized online meeting URL is included in the invitation as a descriptive link.

13. A computer implemented method comprising:
responsive to an activation of a meeting link by a user, the meeting link is for a secure online meeting:
determining an encrypted personalized online meeting Uniform Resource Locator (URL) associated with the meeting link;
decrypting the encrypted personalized online meeting URL to determine a personalized online meeting URL, the personalized online meeting URL having a query string;
validating the user based on the query string; and
responsive to validation of the user, allowing the user to join the secure online meeting;
receiving an invitation including the meeting link; and
responsive to a determination of an opening of an invitation, disabling one or more functions within the opened invitation to prevent sending of the invitation to an uninvited user.

14. The method of claim 13, further comprising:
responsive to not validating the user, not allowing the user to join the secure online meeting.

15. The method of claim 13, wherein the query string is an email address associated with the user.

16. The method of claim 13, wherein the query string is a user identifier associated with the user.

17. The method of claim 13, wherein the meeting link is a descriptive link associated with the encrypted personalized online meeting URL.

18. The method of claim 13, wherein the disabling of the one or more functions within the opened invitation includes disabling a cut/copy/paste function within the opened invitation.

19. The method of claim 13, wherein the disabling of the one or more functions within the opened invitation includes disabling a print screen function while the invitation is open or disabling a print function within the opened invitation.

20. The method of claim 13, wherein the disabling of the one or more functions within the opened invitation includes disabling a forwarding function within the opened invitation.

* * * * *